United States Patent [19]

Matty et al.

[11] 4,387,870
[45] Jun. 14, 1983

[54] TRANSIT VEHICLE SHUNT DETERMINATION

[75] Inventors: Thomas C. Matty, North Huntingdon; James H. Franz, Jr., Murrysville; Carol D. Parham, Jefferson Borough, all of Pa.

[73] Assignee: Westinghouse Electric Corp., Pittsburgh, Pa.

[21] Appl. No.: 258,508

[22] Filed: Apr. 29, 1981

[51] Int. Cl.³ .................... B61L 1/20; B61L 23/00
[52] U.S. Cl. ........................... 246/122 R; 246/29 R; 246/58; 246/169 R; 246/246
[58] Field of Search .................. 104/298, 288, 295; 246/34 C, 34 CT, 29 R, 169 R, 34 R, 1 C, 122 R, 169 D, DIG. 1, 58, 59, 60, 246, 249; 340/522, 521, 38 P

[56] References Cited

U.S. PATENT DOCUMENTS

| 3,394,365 | 7/1968 | Nealis | 191/33 R |
| 3,488,510 | 1/1970 | Raymond et al. | 340/38 P |
| 3,532,877 | 10/1970 | Thorne-Booth | 246/63 C |
| 3,593,022 | 7/1971 | Hoyler | 246/34 R |
| 3,672,611 | 6/1972 | Thorne-Booth | 246/28 R |
| 3,691,368 | 9/1972 | Hoyler | 246/29 R |
| 3,821,544 | 6/1974 | Matty | 246/34 CT |
| 3,825,915 | 7/1974 | Dow | 246/169 R |
| 3,891,167 | 6/1975 | Perry | 246/34 R |
| 3,958,781 | 5/1976 | Woods et al. | 246/34 R |
| 4,155,434 | 5/1979 | Howell, Jr. | 191/22 R |

FOREIGN PATENT DOCUMENTS 2395554 2/1979 France ........................ 340/522

OTHER PUBLICATIONS

Restivo, F., Jones, F., and Fraelich, Jr., K., "Automatic Testing Will Simplify Maintenance of Rail Transit Vehicles", *Westinghouse Engineer*, Mar. 1972.

Tucker, J., "Five Generations: Skybus to Orlando," 29th Vehicle Technology Group Conference, Chicago, Ill., 1979.

Primary Examiner—Bruce H. Stoner, Jr.
Assistant Examiner—R. G. Mathieu
Attorney, Agent, or Firm—R. G. Brodahl

[57] ABSTRACT

A vehicle signal shunt detection apparatus responds to a first signal to establish the presence of a vehicle including a shunt circuit and then responds to a second signal to establish that the shunt circuit is operating to provide a desired predetermined vehicle signal.

5 Claims, 6 Drawing Figures

TRANSIT VEHICLE SHUNT DETERMINATION

BACKGROUND OF THE INVENTION

It is desired in the prior art to determine if a transit vehicle is occupying a given track signal block and to provide an occupancy indication in relation to the roadway track by establishing a signal shunt circuit for a vehicle control signal between a pair of conductive members associated with that track. For example, the track signal block occupancy of a steel wheel vehicle operating with a track comprising a pair of steel rails has been determined in relation to a signal from a speed command transmitter positioned at one end of a particular track signal block that is electrically shunted between the rails by the vehicle occupying that signal block to prevent the signal being sensed by a receiver positioned at the other end of the same track signal block as taught by U.S. Pat. Nos. Re. 27,472 and 3,966,149. In addition, for a vehicle having a vehicle carried transmitter providing a door open control signal that couples with a wayside receiver when the vehicle is located in a station, it is known in the prior art to provide a logic apparatus responsive to a track shunt signal concurrent with the receipt of the door control signal to establish the satisfactory operation of the track signal shunt operation for vehicle occupancy determination. It is known to sense the speed command signal received by the rear signal receiver of the transit vehicle passing through a signal block when the shunt provided by the vehicle should prevent the rear vehicle receiver from receiving that signal to determine that a shunt failure condition might be present. It is known in the prior art to provide mechanical sensing devices for the electrical shunt contacts or brush devices at each side of the track for a rubber-tired vehicle to determine that those shunt providing devices are still physically provided and operating.

It is known in the prior art to provide a power collection apparatus for a rubber-tired vehicle operative with a roadway track having a central guide beam as shown in U.S. Pat. Nos. 4,168,770 and 4,090,452, and including power rails that do not continue through track switches and including control signal and ground rails that do continue through a track switch, with the power collector shoes being guided through a track switch by coupling those power collector shoes with the ground collector shoe and the control signal collector shoe that are positioned by the respective continuous ground rail and control signal rail. This same vehicle is known to include an electrical shunt circuit apparatus carried by the vehicle and connected between a conductive member coupled with the ground rail and a conductive member coupled with the signal rail for providing a desired command signal shunt to indicate track signal block occupancy.

SUMMARY OF THE INVENTION

There is provided a vehicle signal shunt determination apparatus that establishes the vehicle presence and the desired operability of the vehicle signal shunt apparatus in relation to a given track section, with a first signal being provided in accordance with that vehicle presence and a second signal being provided in accordance with a desired signal shunt operation, such that those first and second signals are utilized to provide an indication of the desired signal shunt operation.

PREFERRED EMBODIMENT OF THE INVENTION

Figure 1:
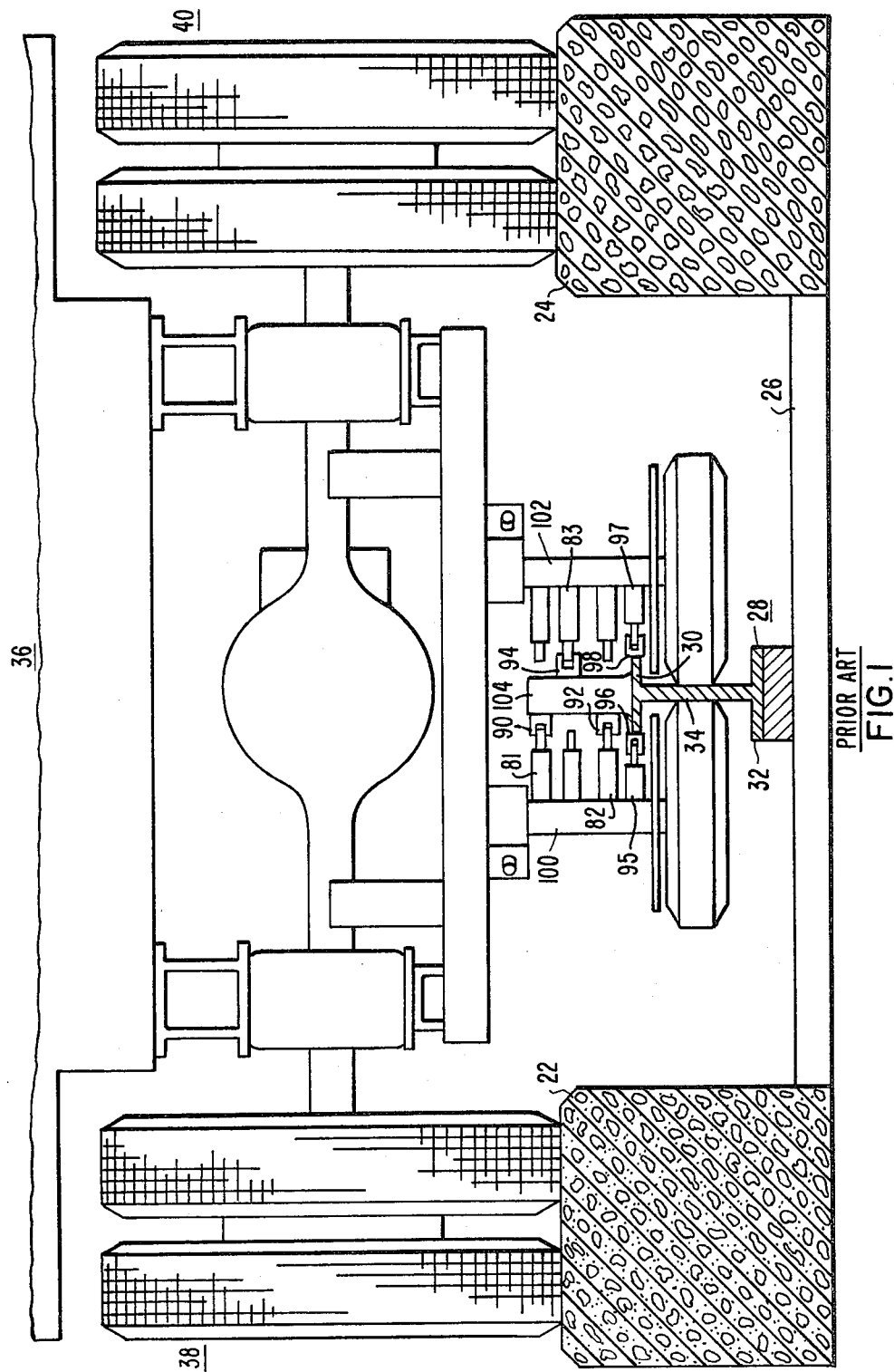
FIG. 1 shows a cross-sectional view of a prior art power collection apparatus for a mass transit vehicle.

FIG. 1 is a cross-sectional view of a transportation system roadway taken along the longitudinal axis of the roadway as described in greater detail in U.S. Pat. No. 4,090,452 and in U.S. Pat. No. 4,168,770. The roadway includes laterally spaced concrete tracks 22 and 24 supported from a road bed 26 and a flanged guide beam 28 located between the tracks 22 and 24 and comprised of an upper flange 30 and a lower flange 32 joined by a vertical web 34. A transit vehicle 36 is shown having laterally spaced wheel apparatus 38 and 40 running on the tracks 22 and 24 respectively. Apparatus for supplying electric power and control signals to the vehicle 36 includes power collectors 81, 82 and 83 in contact with power rails 90, 92 and 94 and a ground collector 95 in contact with a ground rail 96 and a control signal collector 97 in contact with a control signal rail 98. Collectors 81 and 82 are carried by a support mechanism 100 fixed to the vehicle frame, and collector 83 is carried by a similar support mechanism 102 fixed to the vehicle frame. The power rails 90, 92 and 94, the ground rail 96 and the signal rail 98 are insulatively supported by mounting members 104 attached at longitudinal intervals to the upper flange 30 of the guide beam 28.

Figure 2:
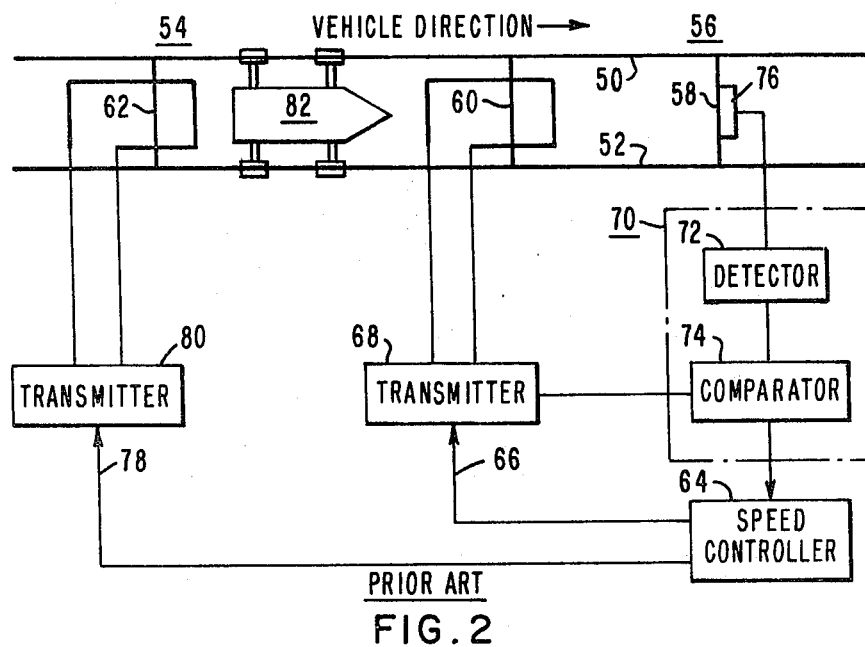
FIG. 2 shows a prior art vehicle occupancy determination by signal shunt operation.

In FIG. 2, there is shown well known vehicle occupancy determination apparatus by a vehicle control signal shunt operation such as described in greater detail in U.S. Pat. No. 3,966,149. The vehicle pathway is comprised of conductive metal rails 50 and 52 which are divided into signal blocks 54 and 56 by conducting bars 58, 60 and 62. A vehicle speed controller 64 delivers a vehicle command speed signal on conductor 66 to transmitter 68 which transmits the speed signal to the rails 50 and 52 of signal block 56. A signal receiver 70 including a detector 72 and a comparator 74 detects logic conditions in the command signals received by antenna 76 and compares these logic conditions with the logic conditions of the signal transmitted by the transmitter 68. If there is not a vehicle occupying the signal block 56, the logic conditions of the transmitted signal corresponds with the logic conditions detected from the received signal and the receiver 70 indicates to the speed controller 64 that no vehicle is occupying the signal block 56. If there is a vehicle positioned within the signal block 56, the vehicle, wheels and axles electrically shunt the speed command signal such that the logic conditions of the signal transmitted by the transmitter 68 do not correspond with the logic conditions detected by the receiver 70, and the receiver 70 indicates to the speed controller 64 that a vehicle is present and occupying the signal block 56. The speed controller 64 then uses the occupancy information to establish a safe vehicle speed command signal which is delivered on the line 78 to a transmitter 80 operative with the previous signal block 54 such that the vehicle 82 positioned within the signal block 54 receives the speed command signal from the rails 50 and 52 to determine the safe operation of the vehicle 82 within the signal block 54 and in relation to any vehicle occupancy of the next signal block 56.

It is important that the vehicle signal shunt operation provided by any vehicle present within the signal block 56 be operative to prevent the signal from transmitter 68 from reaching the antenna 76 and the receiver 70, since otherwise the vehicle occupancy within the signal block 56 may not be detected and the receiver 70 could erroneously indicate no occupancy within the signal block 56 such that the speed controller 64 would cause the transmitter 80 to provide an unsafe command speed signal to the previous signal block 54.

Figure 3:
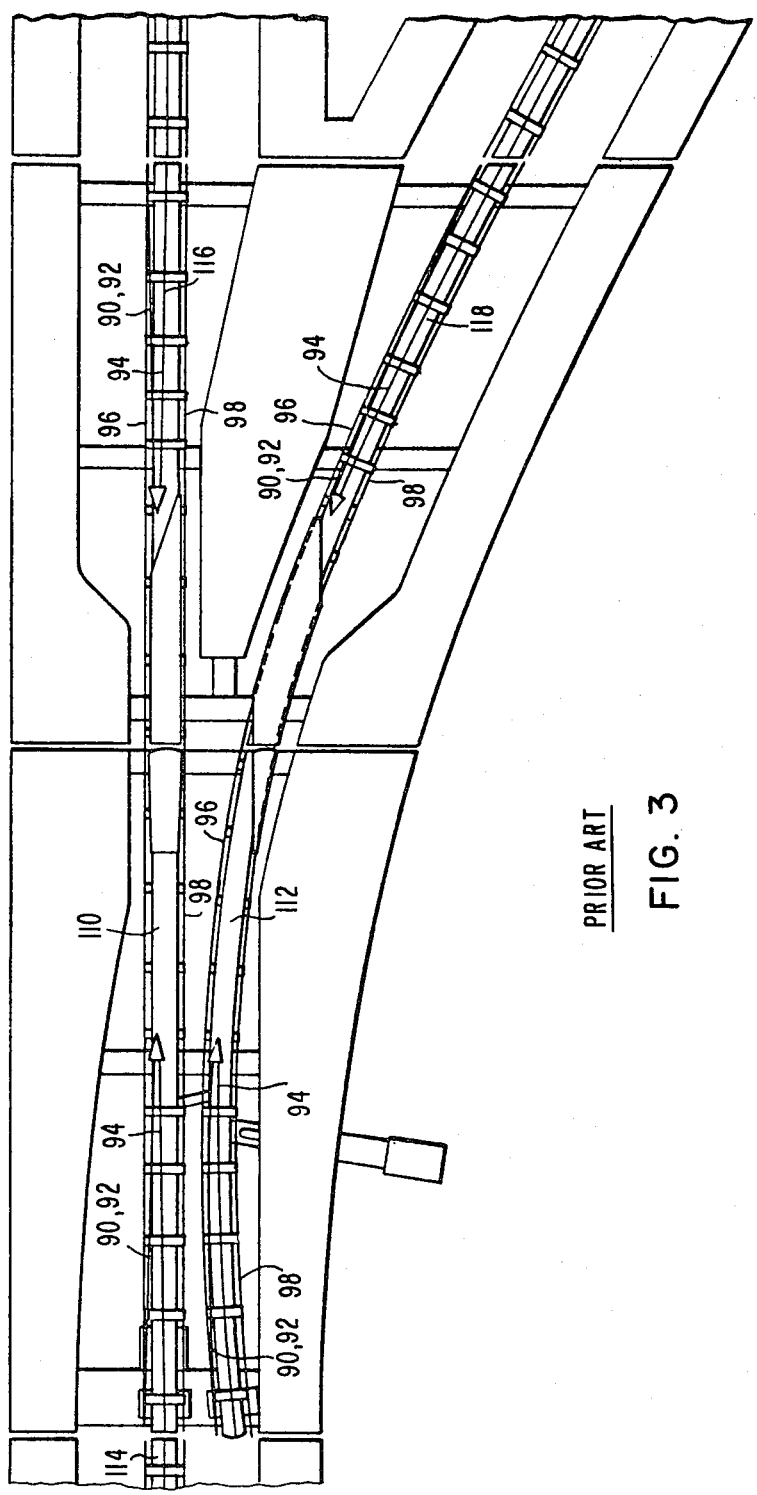
FIG. 3 shows a top projection of a prior art track switch having a pivotal guide beam and including discontinued power rails and continuous ground and signal rails passing through the track switch.

In FIG. 3 there is shown a top projection of a prior art track switch having cooperating pivotal guide beams 110 and 112 as described in greater detail in U.S. Pat. No. 4,090,452. The first roadway guide beam 114, the second roadway guide beam 116 and the third roadway guide beam 118 as well as each of the pivotal guide beams 110 and 112 include power rails 90, 92 and 94 and the ground rail 96 and signal rail 98 mounted on support brackets 110. The power rail arrangement shown in FIG. 3 provides a power rail gap to permit the wheels of a vehicle traveling between roadways 114 and 116 to cross the switching guide beam 112 and similarly a power rail gap is provided to permit the vehicle wheels traveling between roadways 114 and 118 to cross the switching guide beam 110. These gaps are necessary because the power rails project above the top flange of the guide beam switch sections 110 and 112. Since the ground rail 96 and signal rail 98 do not project above the upper horizontal flange of the guide beam, the rails 96 and 98 require no gap to accommodate the vehicle wheels other than a small gap at the ends of the pivotal guide beam sections 110 and 112 to allow those guide beam sections to pivot on the provided bearing assemblies. Power is continuously provided to the vehicle as it negotiates the track switch shown in FIG. 3, in that power collectors are located at the respective ends of each vehicle and are longitudinally displaced by a distance greater than the gap between the ends of the respective power rails as shown in FIG. 3.

Figure 4:
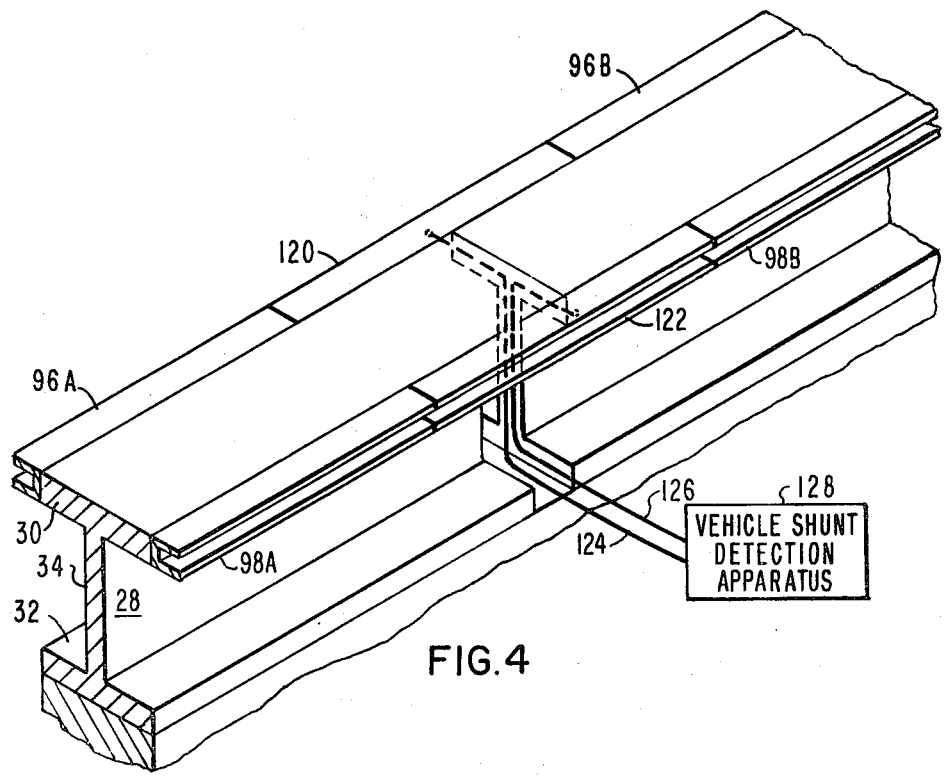
FIG. 4 shows the isolated power rail sections of the present invention.

In FIG. 4 there is shown the electrically isolated ground conductor rail and control signal conductor rail sections provided in accordance with the present invention. The ground rail 96 is provided at a first side of the top flange 30 of the guide beam 28, and the signal rail 98 is similarly provided at the second side of the top flange 30. There is provided an electrically isolated rail section 120 coupled with the first side of the top flange 30 and a second electrically isolated rail section 122 coupled to the second side of the top flange 30, as shown in FIG. 4, such that the collector shoe operative with the ground rail 96 for a vehicle moving in the direction of the arrow will be operative from the ground rail section 96a along the isolated rail section 120 and then become operative with the ground rail section 96b. In a similar manner, the collector shoe for the same vehicle and operative with the signal rail section 98a will move with the vehicle to become operative with the coextensive isolated rail section 122 and then pass to become operative with the signal rail section 98b. The isolated rail sections 120 and 122 can be electrically connected through suitable conductors 124 and 126, such as may be provided in the vertical plane of the web 34 of the guide beam 28, operative with the shunt detection apparatus 128. The isolated rail section 120 and the isolated rail section 122 are shown at opposite sides of the top flange of the I-beam 28.

Figure 5:
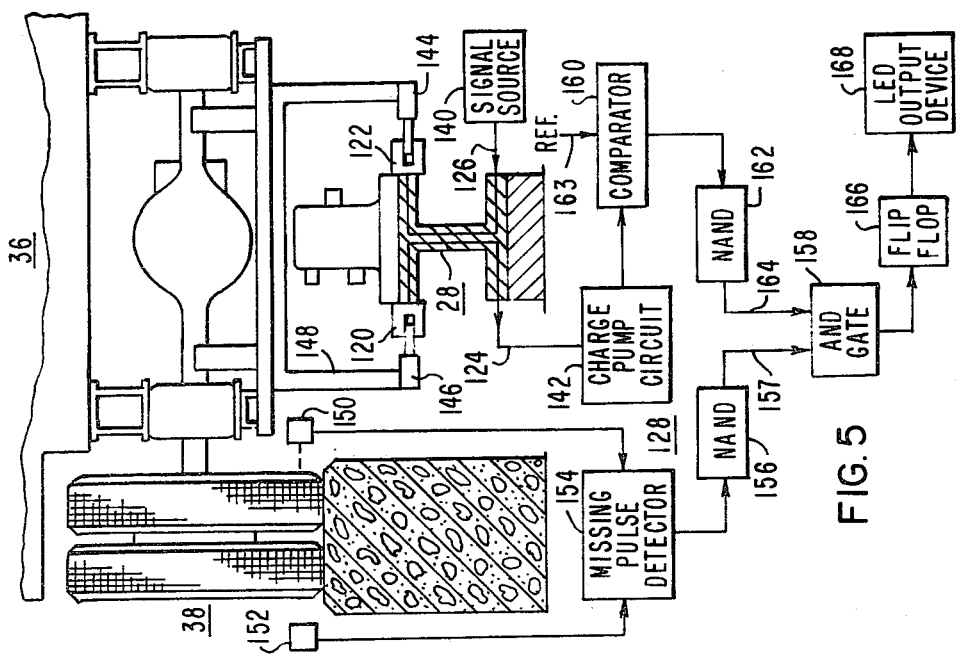
FIG. 5 shows the vehicle shunt detection sensing apparatus of the present invention.

As shown in FIG. 5, a signal source 140 is connected to the rail section 122 and a charge pump circuit 142 is connected to the rail section 120, such that a vehicle 36 can be positioned with the collector shoe 144 electrically connected with the rail section 122 and the collector shoe 146 electrically connected with the rail section 120, and with the electrically conductive member 148 connected between the collector shoes 144 and 146 to complete an electrical circuit from the signal source 140 to the charge pump 142 through the conductors 124 and 126.

A source of pulsed infrared energy 150 supplies an infrared light beam to a receiver 152, which pulsed infrared light beam can be interrupted by the wheels 38 of the vehicle 36. When the vehicle 36 is positioned for the conductor 148 to complete the electrical circuit between the rail sections 120 and 122, the wheels 38 interrupt the infrared light beam from the source 150 to the receiver 152. A missing pulse detector 154 responds to this interruption of the light beam to cause the output signal from the missing pulse detector to change state. The NAND 156 inverts this signal change of state and supplies this inverted signal to one input 157 of an AND gate 158. When the vehicle 36 is positioned such that the conductive member 148 is connected between the rail sections 120 and 122, a signal is supplied on conductor 124 to cause the charge pump circuit 142 to increase the value of its output signal, which output signal is supplied to the comparator 160 for comparison with a reference on input 163. When the output of the charge pump circuit 142 is greater than the reference 163, an output signal is supplied to the inverting NAND 162 and then to the second input 164 of the AND 158. If the output signal 157 supplied to the AND gate 158 indicates the presence of the vehicle wheel 38 between the infrared beam transmitter 150 and the receiver 152 at the same time that the signal 164 indicates that the circuit is not completed between the rail sections 120 and 122, the AND gate 158 provides an output to the flip-flop 166, which causes the flip-flop 166 to change state and causes the LED output device 168 to provide an indication that the electrical shunt 148 is not operating as desired.

Figure 6:
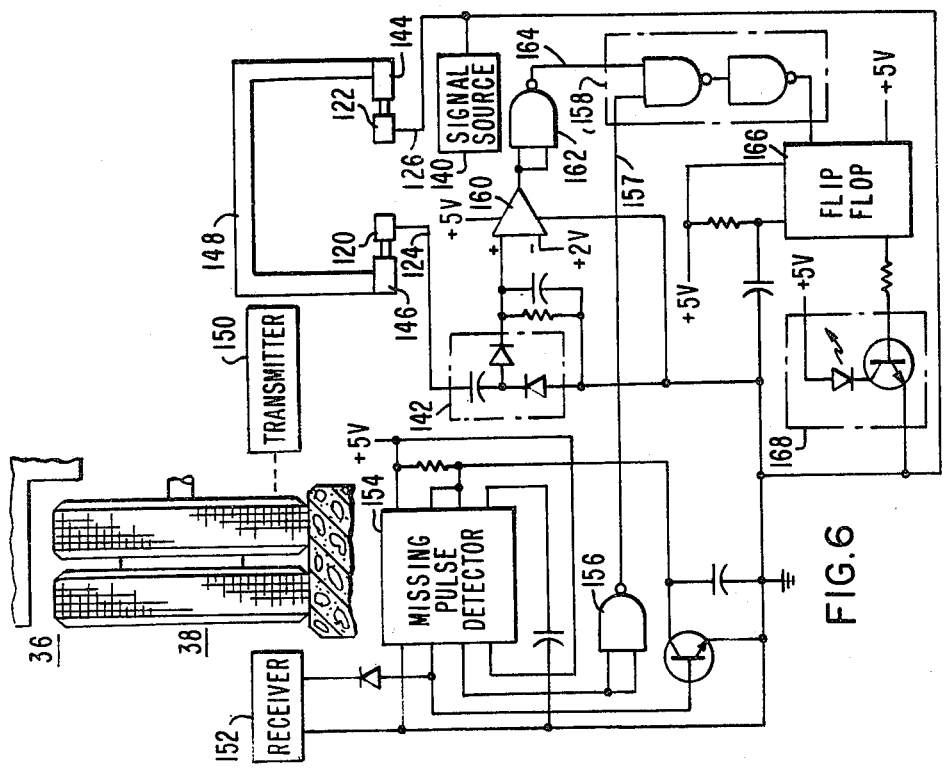
FIG. 6 illustrates a suitable embodiment of the present invention.

In FIG. 6, there is schematically illustrated a suitable embodiment of the apparatus shown in FIG. 5. When a vehicle 36 is present such that the collector shoes 144 and 146 are electrically coupled with the rail sections 120 and 122, this connects the output of the signal source 140, which can be a well known Wavetek 10 kilohertz square wave generator, with the charge pump circuit 142. The two collector shoes 144 and 146 carried by the vehicle are interconnected by conductor 148 to complete a circuit between the rail sections 120 and 122 when the vehicle 36 is present at the location of the isolated rail sections. This vehicle presence can be utilized for signal block occupancy detection of the vehicle. The charge pump 142 operates with the comparator 160 such that in effect a threshold level is provided by the reference input 163 provided to the comparator 160. The square wave signal from the signal source 140 passes through the isolated rail sections 120 and 122 and back to the charge pump 142 when the vehicle shunt is present, which causes the charge pump 142 to charge up. When the positive output signal from the charge pump 142 goes above the two volts reference 163 provided to comparator 160, the comparator 160 then provides an output to the inverter 162 and to one input 164 of the AND gate 158. When the vehicle 36 is positioned such that it provides an electrical shunt between the rail sections 120 and 122, the vehicle wheel 38 shown in FIG. 5 is positioned between the infrared transmitter 150 and the infrared signal receiver 152, which can comprise Optodata Model 5018 transmitters and receivers, for the purpose of detecting the presence of the vehicle wheel 38. A pulse wave signal of about 2 kilohertz of flashing infrared light is provided between the transmitter 150 and the receiver 152, and the beam interruption establishes that the vehicle wheel 38 is present between the units 150 and 152. Normally, a steady AC pulse signal is sent to the missing pulse detector 154, which can be a Signetics 555 timer illustrated at page 723 of the Signetics Catalog dated 1977. The output from the missing pulse detector is at pin 3, and if the wheel 38 is present between the infrared units 150 and 152, the output signal on pin 3 goes from a high to a low value as a transition and the NAND 156 inverts this signal and applies it to input 157 of the AND gate 158.

If the charge pump 142 is not charged up to provide an output positive signal greater than two volts on input 164 of the AND gate 158 at the same time that the missing pulse detector 154 provides an output signal change on input 157 to indicate the presence of the vehicle wheel between the infrared beam transmitter 150 and the receiver 152, the two inputs 157 and 164 of the AND gate 158 will be simultaneously energized to cause the flip-flop 166 to provide a signal transition to cause the LED output device 168 to turn on and indicate the presence of a vehicle has been detected and to indicate that the vehicle carried shunt apparatus 144, 146 and 148 is not operating properly and as desired.

For the embodiment of FIG. 6 that was actually built and tested, the center axis of the vehicle wheel 38 was about six inches from the collector shoes 144 and 146 along the longitudinal axis of the roadway. Accordingly, when the wheel 38 was detected by the infrared apparatus including the transmitter 150 and receiver 152, the signal shunting by the collector shoes 144 and 146 should be detected in conjunction with the isolated rail sections which were made 42 inches in length and positioned to extend 21 inches on each side of the infrared light beam provided by the transmitter 150. When the receiver 152 detects no infrared signal, the shunt detection apparatus looks to determine if the signal shunting effect is provided by the two collector shoes 144 and 146 operating with the conductor 148. The absence of this signal shunting effect is established when between the isolated rails 120 and 122 a closed circuit is not provided for the pulse coded signal from the source 140 such that the charge pump circuit 142 is not charged up and then provides a zero output signal. The NAND 162 now provides a first ONE output to the AND 158. When the wheel 38 is sensed, the NAND 156 provides a second ONE output to AND 158. The AND 158 then causes the flip-flop 166 to change state, which causes the LED 168 to light up to indicate the shunt circuit connection is missing between the rails 120 and 122.

We claim:

1. In shunt determination apparatus operative with a vehicle including a conductive shunt circuit, said vehicle being operative with a roadway track including first and second conductive rail members, the combination of,
   a first electrically isolated rail provided as a section of said first rail member,
   a second electrically isolated rail provided as a section of said second rail member,
   means providing a first output signal in response to the presence of said vehicle at a predetermined location in relation to the first and second isolated rails along the length of said roadway track,
   means supplying a control signal to the first isolated rail,
   means coupled with the second isolated rail and providing a second output signal in relation to said control signal being conductive through said shunt circuit to establish that said shunt circuit is conductive between said first and second isolated rails, and
   indication means energized in response to the first output signal and the second output signal being provided to indicate the operation of said shunt circuit.

2. The shunt determination apparatus of claim 1, with the first output signal providing means including an energy beam transmission path that is interrupted by the presence of the vehicle positioned at said location along the roadway track.

3. The shunt determination apparatus of claim 1, with the second output signal providing means including the vehicle conductive shunt circuit coupled between the first and second rails in a shunt detection signal path operative with said indication means.

4. The shunt determination apparatus of claim 1, with the second output signal not being provided when the shunt circuit is conductive between said isolated rails and with the energization of the indication means taking place when the second output signal is provided simultaneously with the first output signal.

5. In signal shunt detection apparatus for a vehicle moving along a roadway track and having a conductive member, the combination of,
   first and second electrically isolated conductor sections positioned parallel to and included in a portion of the track,
   first signal means providing a first signal in relation to the roadway track such that the vehicle when positioned within said portion of the track interrupts the first signal,
   second signal means providing a control signal to the first conductor section and operative with the conductive member to shunt the control signal to the second conductor section when the vehicle is positioned within said portion of the track,
   detection means coupled to the first means for providing a first output signal when the vehicle interrupts the first signal, and
   means coupled to the second conductor and responsive to the first output signal from the detection means and responsive to the control signal from the second conductor section for providing a second output signal when the control signal is not provided simultaneously with the first output signal.

* * * * *